United States Patent [19]

Rosaen

[11] 4,139,466
[45] Feb. 13, 1979

[54] DIFFERENTIAL FLUID PRESSURE INDICATING DEVICE

[76] Inventor: Nils O. Rosaen, 7108 Bridge Way, Pebble Creek, W. Bloomfield, Mich. 48033

[21] Appl. No.: 831,385

[22] Filed: Sep. 8, 1977

[51] Int. Cl.$^2$ ............................................. B01D 35/00
[52] U.S. Cl. .................................... 210/90; 116/268; 210/106; 210/DIG. 14
[58] Field of Search ................. 210/90, 106, 108, 130, 210/132, 133, DIG. 14; 55/274; 116/114 PV

[56] References Cited

U.S. PATENT DOCUMENTS

| | | | |
|---|---|---|---|
| 3,028,009 | 4/1962 | Scavuzzo et al. | 116/114 PV |
| 3,052,206 | 9/1962 | Scavuzzo | 116/114 PV |
| 3,247,824 | 4/1966 | Rodgers | 116/114 PV |
| 3,950,248 | 4/1976 | Brown et al. | 210/90 |

*Primary Examiner*—John Adee

*Attorney, Agent, or Firm*—Gifford, Chandler, Van Ophem, Sheridan & Sprinkle

[57] ABSTRACT

A differential fluid pressure indicating device for use in conjunction with a filter body carrying a filter element which provides an exteriorly visible signal when the differential pressure across the filter element exceeds a predetermined amount. The device comprises a housing having a cylindrical chamber in which a rotationally constrained piston is axially slidably disposed and movable between a first and second axial position while resilient means urge the piston towards its first axial position. The inlet fluid pressure communicates with one axial end of the piston while the outlet fluid pressure communicates with the other axial end of the piston. When the differential pressure across the filter element exceeds a predetermined value, the inlet fluid pressure moves the piston from its first to its second axial position and releases a spring loaded exteriorly visible member which rotates from a first to a second rotational position.

7 Claims, 5 Drawing Figures

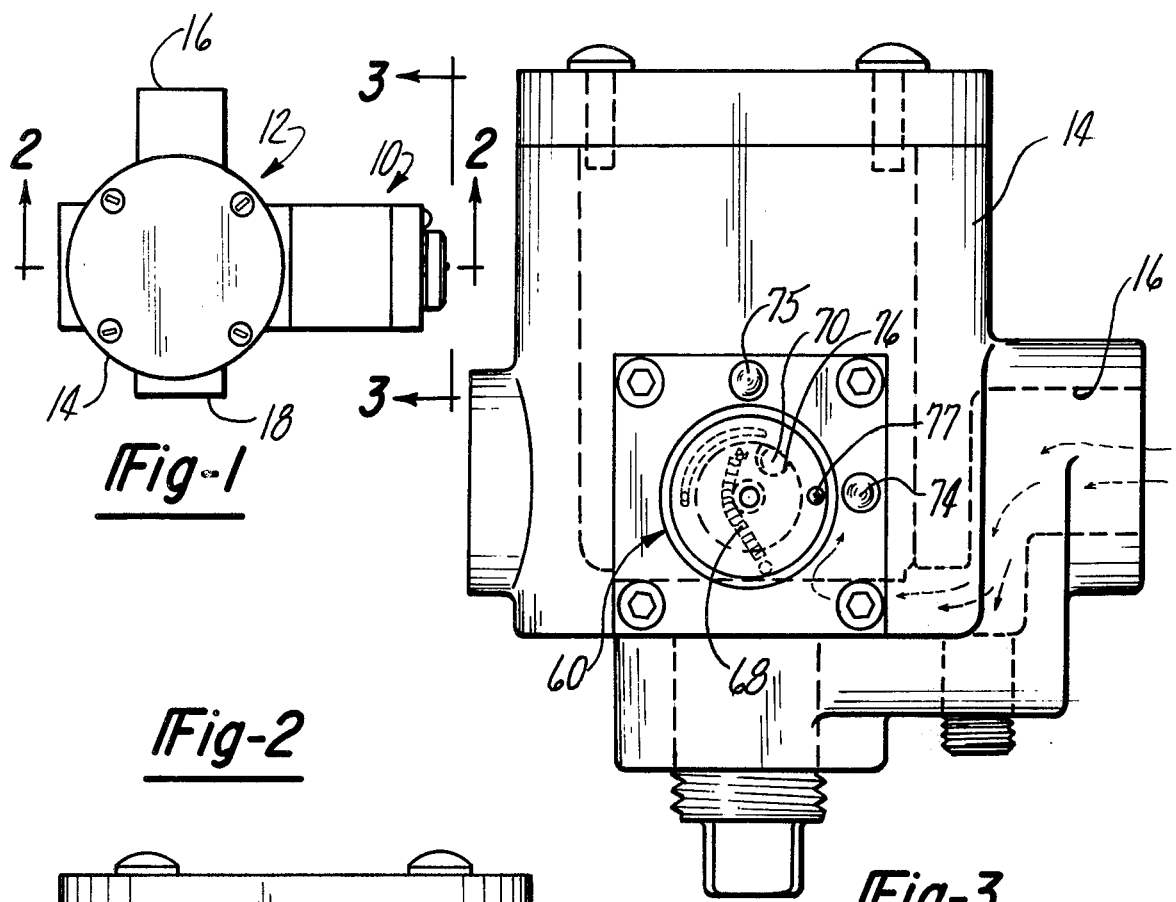
Fig-1
Fig-3
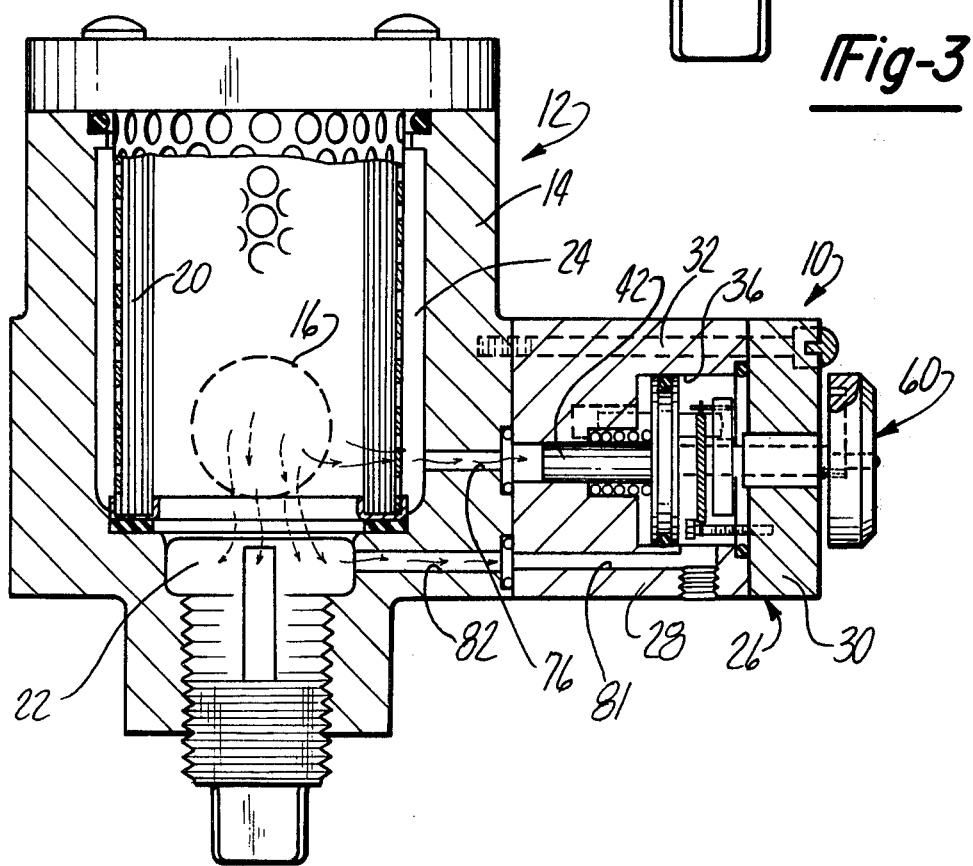
Fig-2

DIFFERENTIAL FLUID PRESSURE INDICATING DEVICE

BACKGROUND OF THE INVENTION

1. Field of the Invention

The present invention relates generally to pressure responsive devices and, more particularly, to such a device responsive to the differential pressure across a filter element to provide an exteriorly visible signal when the differential pressure exceeds a predetermined amount.

2. Description of the Prior Art

There have been many previously known fluid devices which are responsive to the differential pressure across a filter element to indicate the presence of a clogged or dirty filter element. Several of these previously known devices utilize a piston axially slidably disposed within a bore in the housing wherein the filter inlet pressure communicates with one axial end of the piston while the filter outlet pressure communicates with the other axial end.

Typically, the previously known pistons are rotatably constrained and cooperate with a twisted and flat, elongated member so that the member rotates as the piston travels along the bore. An indicator needle secured to one end of the twisted member provides an exteriorly visible indication of the axial position of the piston and, hence, the degree of clogging of the filter element. These previously known devices provide a continuous display of the degree of filter clogging. When filter clogging exceeds a predetermined amount, the filter element is replaced.

While these previously known differential fluid pressure indicators have proven adequate in operation, such devices are relatively expensive to manufacture and maintain. Moreover, for many fluid filtering applications, a signal visible only when the differential pressure across the filter element exceeds a predetermined amount is adequate without a continuous visual display of the differential pressure and, hence, of the degree of filter clogging.

SUMMARY OF THE PRESENT INVENTION

The indicating device of the present invention overcomes these above mentioned disadvantages of the previously known indicator devices by providing a simple and inexpensive differential pressure indicator which provides an exteriorly visible signal only when the differential pressure across the filter element exceeds a predetermined amount.

In brief, the indicator device of the present invention comprises a housing having a chamber formed therein. A rotationally constrained piston sealingly engages the walls of the chamber and is axially movable within the chamber between a first or outer position and a second or inner axial position. Resilient means, such as a helical spring, urge the piston towards its first axial position.

The housing is attached to a filter body so that the filter outlet pressure communicates with the inner end of the piston while the filter inlet pressure communicates with the outer axial end of the piston. When the differential pressure between the filter inlet and outlet exceeds a predetermined value, the piston axially shifts against the force of the resilient means from its first to its second axial position adjacent the open end of the chamber.

A spool shaped indicator is rotatably mounted in the housing so that one end of the indicator is visible exteriorly of the housing. A spring urges the indicator from a first to a second rotational position. The piston, however, engages and retains the indicator in its first position when the piston is in its first position. Conversely, when the differential pressure between the filter inlet and outlet exceeds a predetermined value, the piston shifts to its second position and releases the indicator which, in turn, rotates to its second rotational position.

It can thus be seen that the device of the present invention provides a simple and inexpensive means for visually indicating when the differential pressure across the filter element exceeds a predetermined value. While the device of the present invention does not continuously display the differential pressure across the filter element and, hence, the degree of clogging of the filter element, for many filtering applications such a continuous display is unnecessary.

BRIEF DESCRIPTION OF THE DRAWINGS

A better understanding of the present invention will be had upon reference to the following detailed description when read in conjunction with the accompanying drawings wherein like reference characters refer to like parts throughout the several views and in which:

FIG. 1 is a top plan view illustrating the indicator device of the present invention and secured to a filter housing;

FIG. 2 is a sectional view taken along line 2—2 in FIG. 1 and enlarged for clarity;

FIG. 3 is a plan view taken substantially along line 3—3 in FIG. 1 and enlarged for clarity;

DETAILED DESCRIPTION OF THE PRESENT INVENTION

Figure 4:
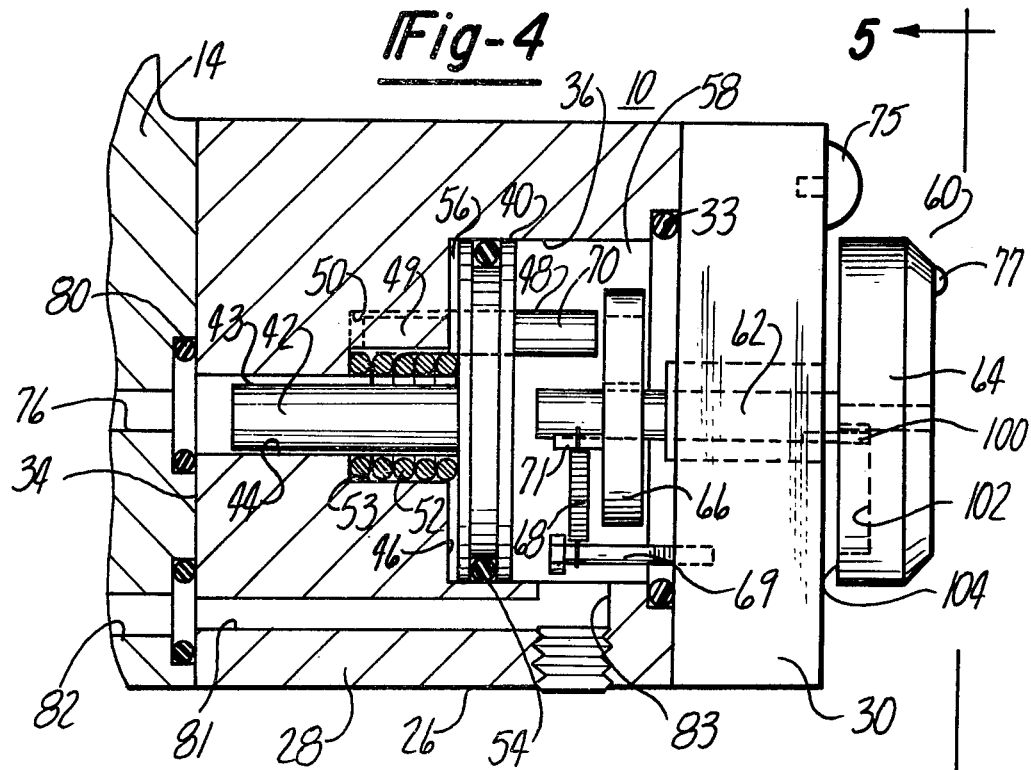
FIG. 4 is a fragmentary sectional view of the indicator device of the present invention.

With reference first to FIGS. 1 and 2, the indicator device 10 of the present invention is thereshown secured to a filter means 12. The filter means 12 may be of any conventional construction and includes a body 14 having an inlet 16 and an outlet 18. A filter element 20 is operatively disposed between the inlet 16 and the outlet 18 thus defining an inlet chamber 22 open to the inlet 16 and an annular outlet chamber 24 open to the outlet 18.

With reference now to FIGS. 2 and 4, the indicator device 10 according to the present invention is thereshown and comprises a housing 26 having an inner first part 28 and an outer part 30. The housing parts 28 and 30 are in axial alignment and are secured to the filter body 14 by bolts 32 with appropriate sealing means 33 thereshown so that the inner face 34 of the first part 28 flatly abuts against the filter body 14. A cylindrical chamber 36 is formed in the housing first part 28 having one axial end open to the housing second part 30.

A disk shaped piston 40 having a stem 42 is disposed within the chamber 36 so that the stem 42 is received within an axial through bore 44 in the base 46 of the chamber 36. A second rod 48 is also axially secured to and through the piston 40 at a position radially spaced from the stem 42. One end 49 of the rod 48 is received within a bore 50 in the base 46 of the chamber 36.

The piston 40 is movable between an outer or first axial position (illustrated in FIG. 2) and an inner or second axial position (illustrated in FIG. 4) but is rotationally constrained by the rod 48. A helical spring 52 disposed around the stem 42 in an enlarged diameter portion 53 of the bore 44 urges the piston 40 to its outer or first axial position while a sealing ring 54 around the piston 40 provides a sealing engagement between the piston 40 and the chamber 36. Thus, the piston 40 divides the chamber 36 between an inner chamber 56 and an outer chamber 58.

A spool shaped indicator 60 is rotatably mounted about its midportion 62 in the housing second part 30 substantially coaxially with the piston 40. The indicator 60 includes an enlarged diameter portion 64 at one end which is positioned and visible exteriorly of the housing 26 and an inner enlarged diameter portion 66 at its other end which is contained within the outer annular chamber 58.

Figure 5:
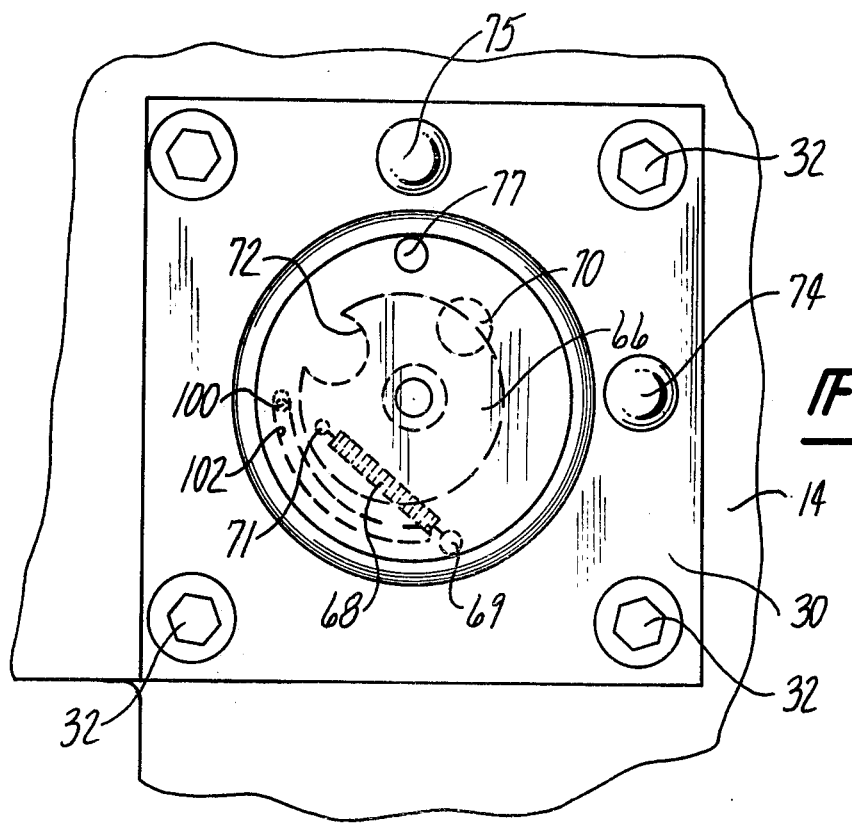
FIG. 5 is a plan view taken substantially along line 5—5 in FIG. 4.

With reference now to FIGS. 4 and 5, a spring 68 is secured at one end by a screw 69 to the housing second part 30 and at its other end to a pin 71 radially spaced from the axis of rotation of the indicator 60. The spring 68 is in a state of tension and urges the indicator 60 from a first to a second rotational position (shown in FIG. 5). A pin 100 is secured to the housing second part 30 and is slidably received within an arcuate slot 102 in the bottom 104 of the enlarged diameter portion 64 of the indicator 60 to limit the rotation of the indicator 60 to approximately 90 degrees.

The other axial end of the rod 48 through the piston 40 forms a stop member 70 which registers with and is received within a recess 72 in the spool portion 66 when the piston 40 is in its first or axially outer position and holds the indicator in its first rotational position. Conversely, when the piston 40 moves to its second or inner axial position, the stop member 70 releases the spool portion 66 so that the indicator 60 can rotate from its first to its second rotational position via the action of the spring 68. Appropriate marks 74 and 75 on the housing part 30 in conjunction with a mark 77 on the indicator portion 64 provides a visible indication of the rotational position of the indicator 60.

A fluid passageway 76 in the filter body 14 connects the inner chamber 56 with the fluid outlet 18 via the through bore 44 in the housing part 28 and a slot or flat 43 in the stem 42. Appropriate sealing means 80 provide a fluid tight connection between the passageways 76 and 44. Similarly, a second fluid passageway 81 in the housing part 28 is fluidly connected with the filter inlet 16 via a passageway 82 in the filter body 14. The other end of the passageway 81 is connected with the outer chamber 58 via a cross bore 83. By these fluid connections, the inner axial end of the piston 40 is subjected to the outlet fluid pressure while, conversely, the outer axial end of the piston 40 is subjected to the inlet fluid pressure.

With reference now particularly to FIGS. 2–5, the operation of the indicator device 10 of the present invention is as follows: Assuming that the filter element 20 is relatively clean, the differential pressure across a filter element 20, and hence, the differential pressure between the filter inlet chamber 22 and outlet chamber 24, is relatively small. Likewise, the differential fluid pressure between the chambers 56 and 58 in the indicator device 10 is relatively small so that the helical spring 52 urges the piston 40 to its outer or first axial position (FIG. 2). As a result, the piston stop member 70 is positioned within the indicator recess 72 which holds the indicator 60 in its first rotational position against the action of the spring 68. The registration of the marks 74 and 77 (FIG. 3) provides a visual indication of this condition.

As the filter element 20 removes impurities from the fluid and becomes progressively more clogged, the differential pressure across the filter element 20 increases in the well-known manner. Likewise, the differential pressure between the fluid chambers 56 and 58 increases progressively which shifts the piston 40 leftwardly against the action of the helical spring 52.

At a predetermined degree of clogging of the filter element 20, as defined by the predetermined differential pressure across the filter element 20, the piston 40 moves to its second or inner axial position shown in FIG. 4. In doing so, the stop member 70 moves out of engagement with the recess 72 which releases the indicator 60. Then, the spring 68 rotates the indicator 60 to its second rotational position as indicated by the registration of the marks 77 and 75 (FIG. 4). This is indicative that the filter element 20 should be changed or cleaned.

Following the cleaning or changing of the filter element 20, the differential pressure across the fluid chambers 56 and 58 again returns to its relatively small value. Thereafter, manual rotation of the indicator portion 64 from its second to its first rotational position again registers the stop member 70 with the recess 72 whereupon the piston 40 snaps or shifts rightward to its first or outer axial position. The operation of the indicating device 10 according to the present invention as set forth above can then be repeated.

It can thus be seen that the differential pressure indicator 10 of the present invention provides a novel and inexpensive indicator device for use with a filter means to indicate the presence of a clogged filter element. Although the device 10 of the present invention does not provide a continuous display of the degree of the clogging of the filter element but rather only provides a visual signal when a predetermined degree of clogging of the filter element has occurred, for many applications the latter signal is totally adequate.

Having thus described my invention, however, many modifications thereto will become apparent to those skilled in the art to which it pertains without deviation from the spirit of the invention as defined by the scope of the appended claims.

I claim:

1. A differential fluid pressure indicating device comprising:
    a housing having a main chamber formed therein;
    a piston axially slidably disposed in said main chamber which divides the main chamber into an inner and outer fluid chamber, said piston being movable between a first and a second axial position in the main chamber;
    means for rotatably constraining said piston;
    resilient means for urging said piston toward said first position;
    means for communicating a first fluid pressure to the inner chamber;
    means for communicating a second fluid pressure to the outer chamber;
    indicating means comprising a spool shaped member having a first enlarged diameter end positioned exteriorly of said housing and a second enlarged diameter end being positioned within the outer fluid chamber, said spool shaped member being movable between a first rotational position and a second rotational position;

further resilient means for urging said spool member from its first and to its second rotational position; and means carried by the piston for holding said spool member in its first rotational position when said piston is in its first position, said holding means being operable to release said spool member when said piston moves to its second position, said holding means further comprising a pin carried by said piston, said pin being in alignment with and engaging a recess formed in said second end of said spool member when said piston and said spool member are in their respective first positions, said pin being moved out of engagement with said spool recess when said piston moves to its second position whereupon said second mentioned resilient means rotates said spool member to its second rotational position.

2. The device as defined in claim 1 and including filtering means having an inlet and an outlet wherein said first fluid pressure is the outlet fluid pressure and wherein said second fluid pressure is the inlet fluid pressure.

3. The invention as defined in claim 1 wherein said rotational constraining means further comprises an axially aligned pin secured to said piston and slidably received in a bore in the housing.

4. The invention as defined in claim 1 and including means for limiting the rotational position of said spool member between said first and second rotational position.

5. The invention as defined in claim 1 wherein said further resilient means comprises a spring secured at one end to said housing and at its other end to the latter enlarged diameter portion of said spool member.

6. The invention as defined in claim 1 wherein said pin extends axially through said piston and is slidably received in a bore in said housing to form said rotational constraining means.

7. The invention as defined in claim 1 wherein further resilient means comprises a spring secured at one end to said housing and its other end secured to the spool member.

* * * * *